Jan. 16, 1934.　　　B. A. PROCTOR　　　1,944,037
FILM HANDLING AND APPARATUS THEREFOR
Filed March 20, 1929　　　7 Sheets-Sheet 3
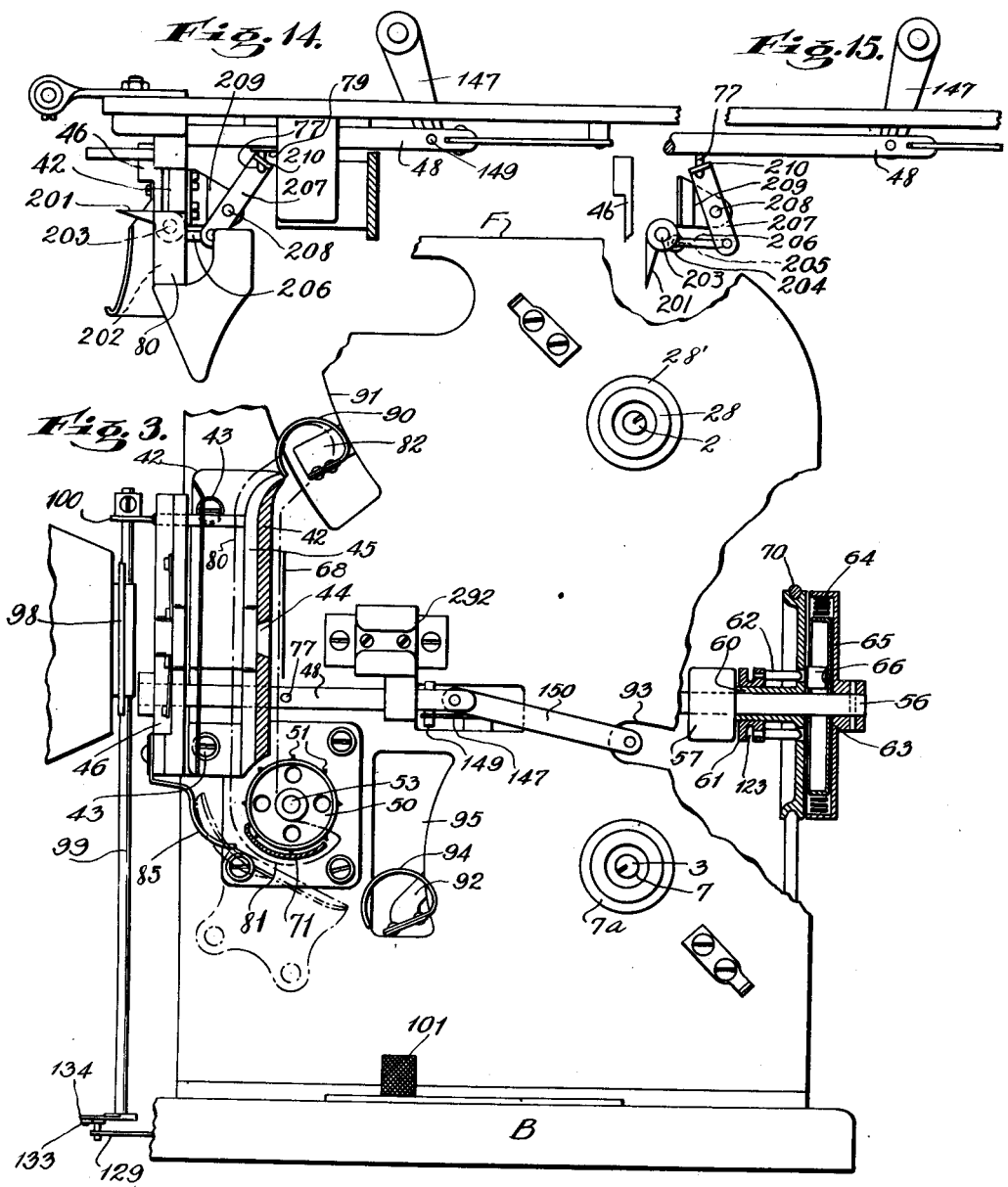
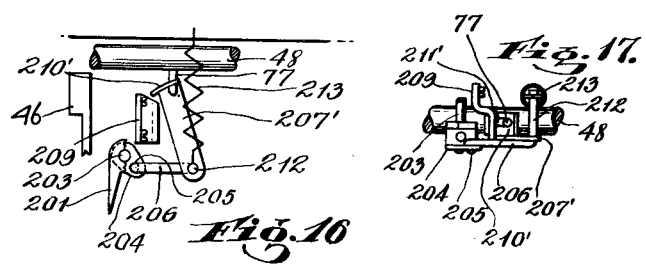
INVENTOR.
BARTON ALLEN PROCTOR
BY Waldo G. Morse
ATTORNEYS.

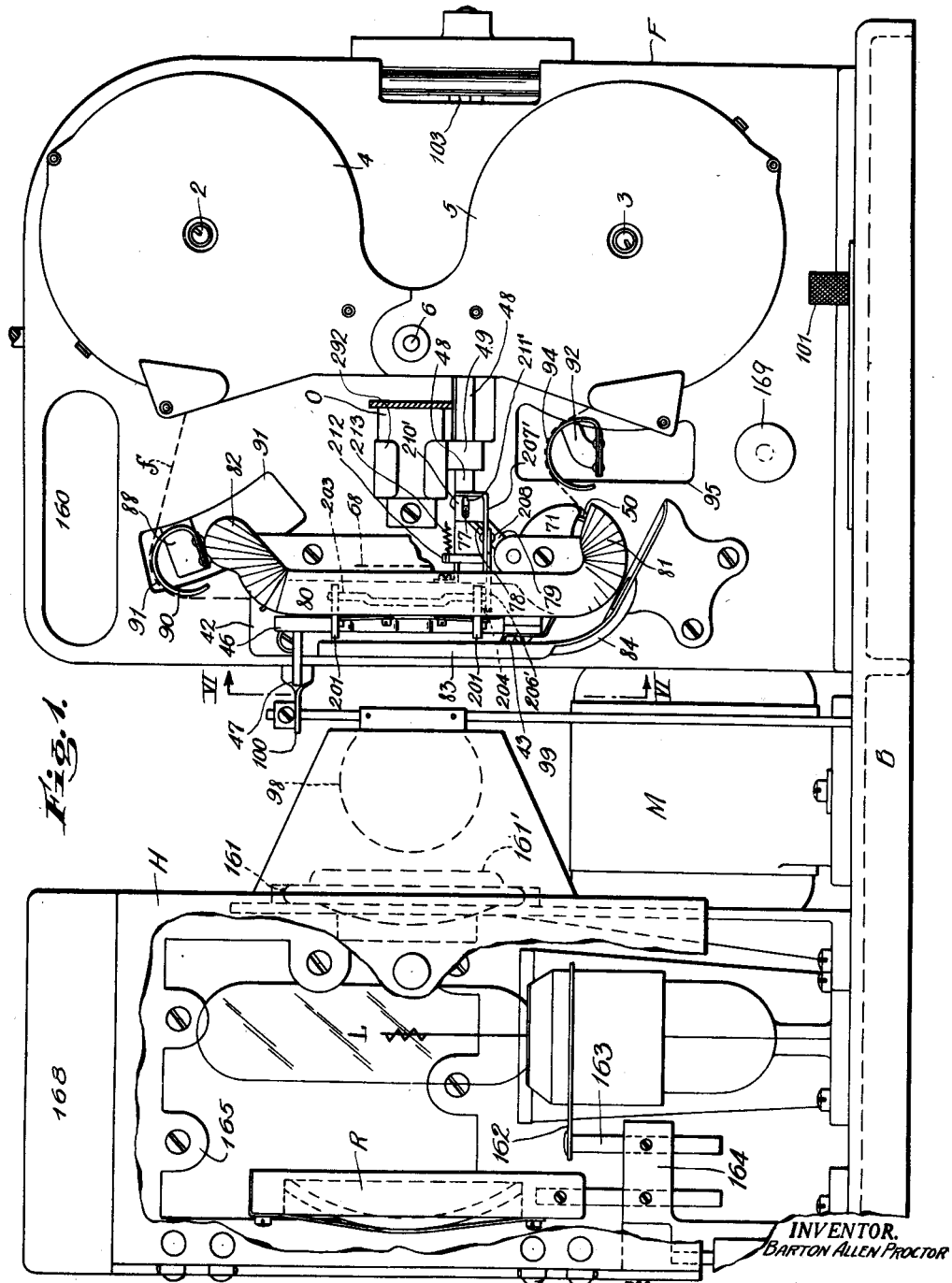

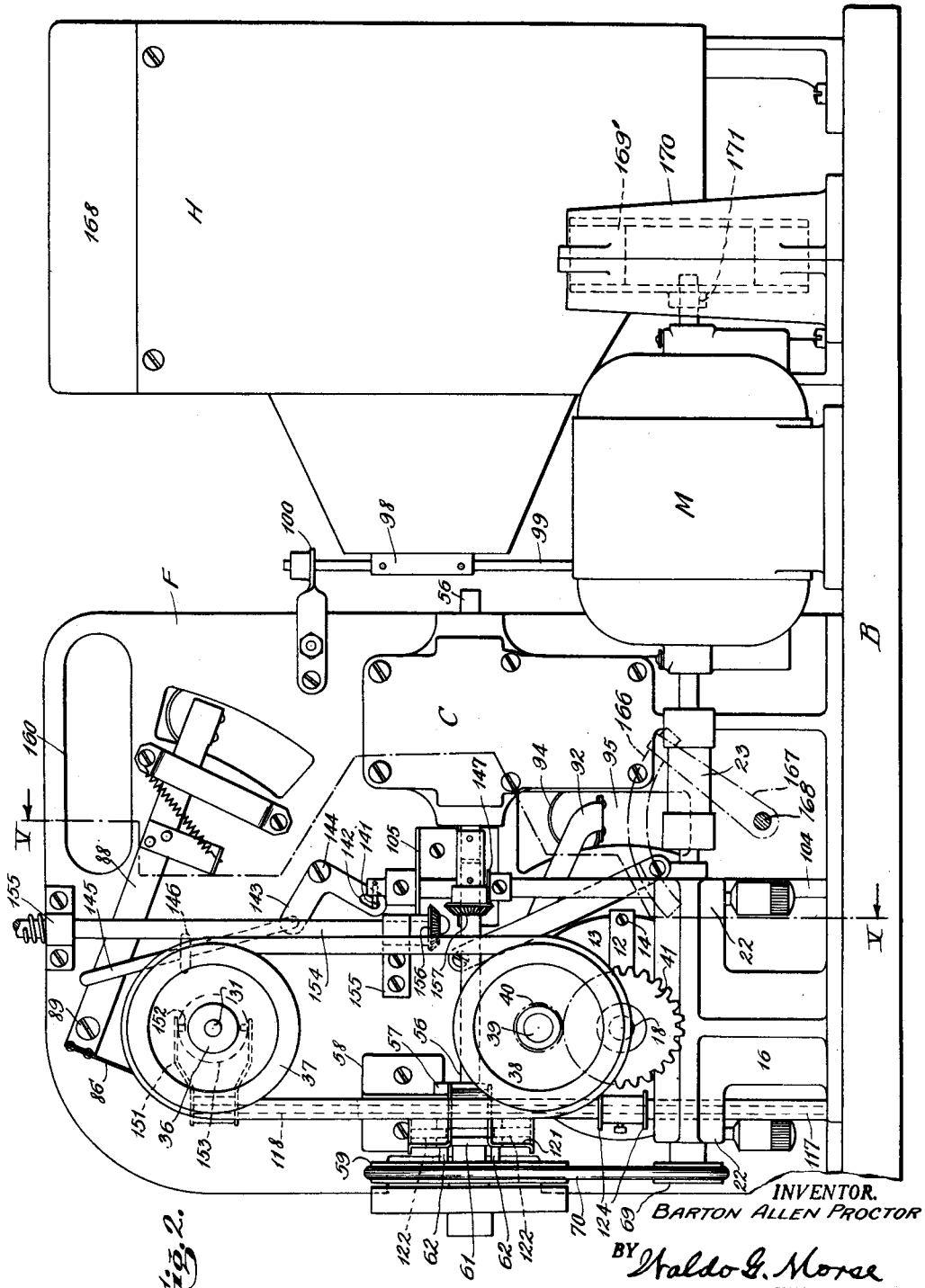

Jan. 16, 1934.   B. A. PROCTOR   1,944,037
FILM HANDLING AND APPARATUS THEREFOR
Filed March 20, 1929    7 Sheets-Sheet 4
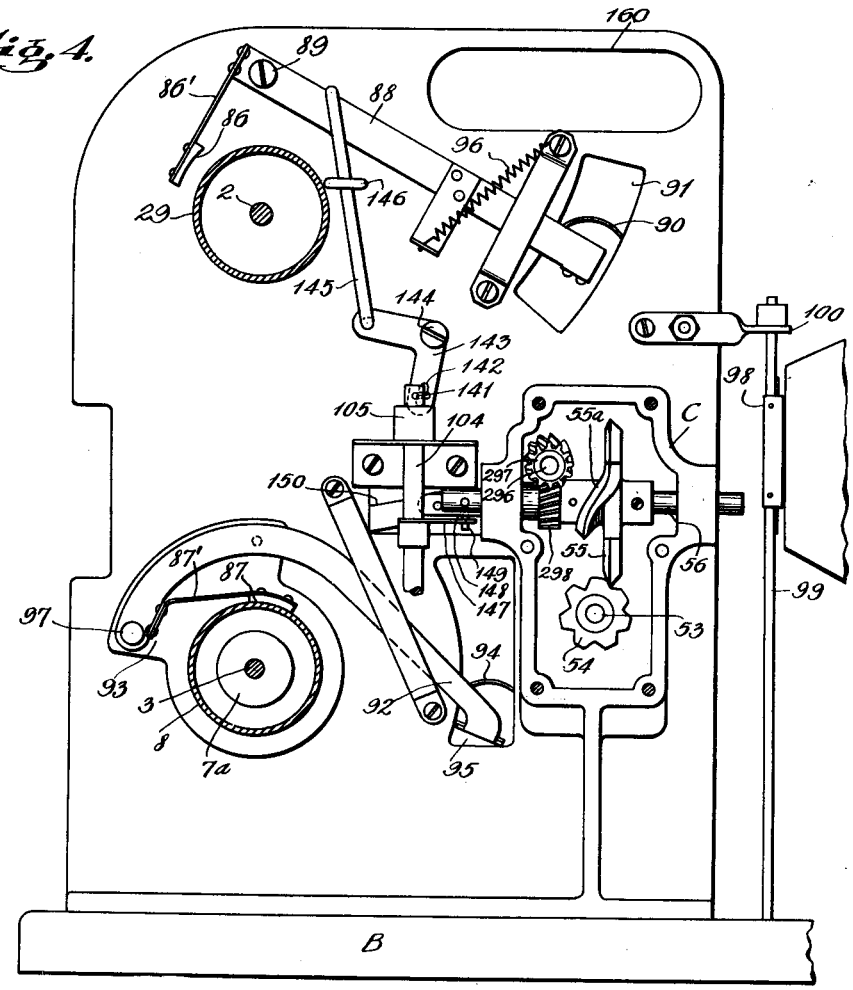
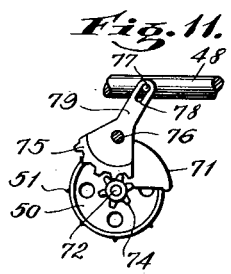
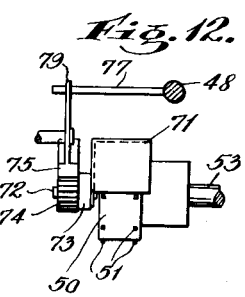
INVENTOR.
BARTON ALLEN PROCTOR
BY Waldo G. Morse
ATTORNEYS.

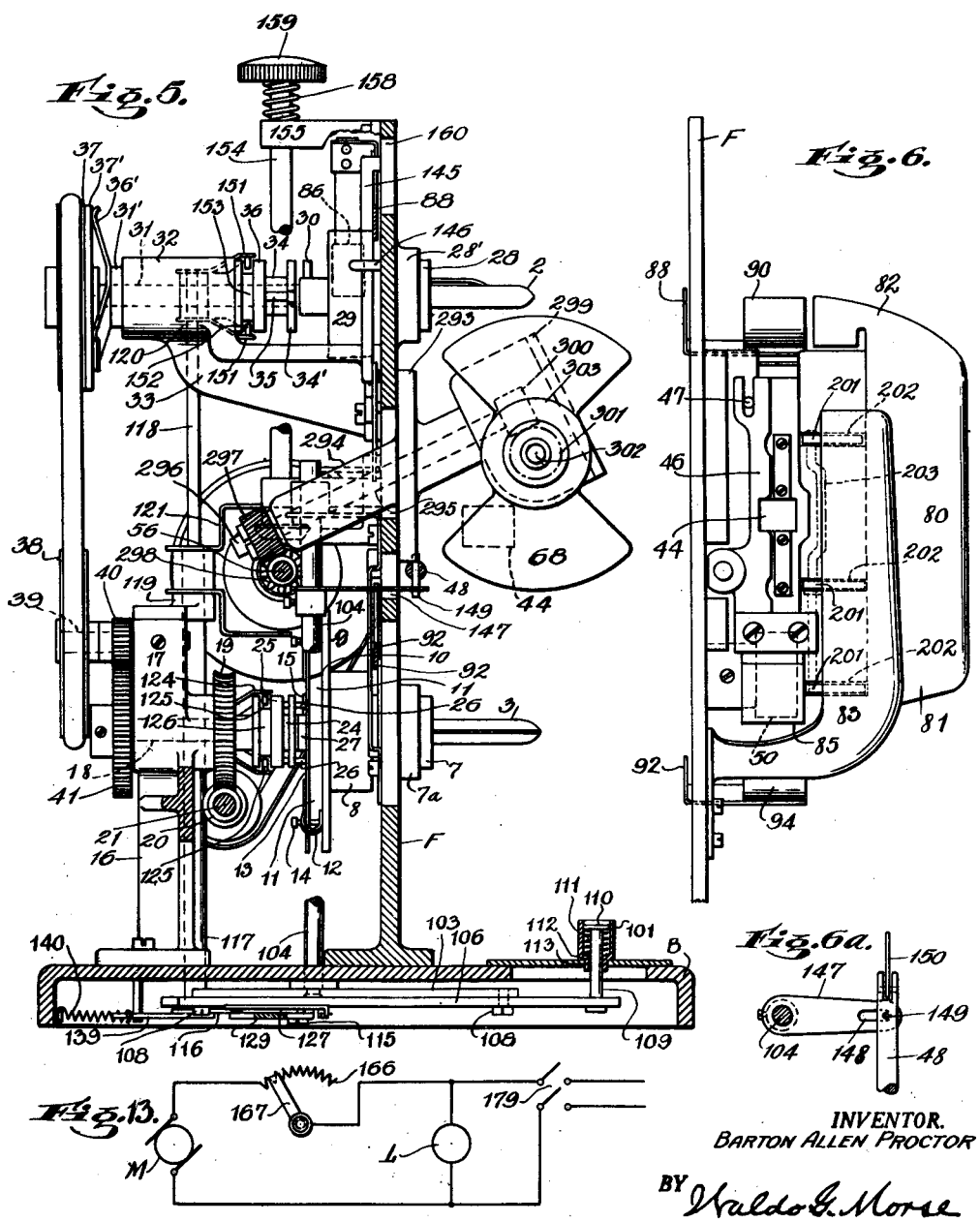

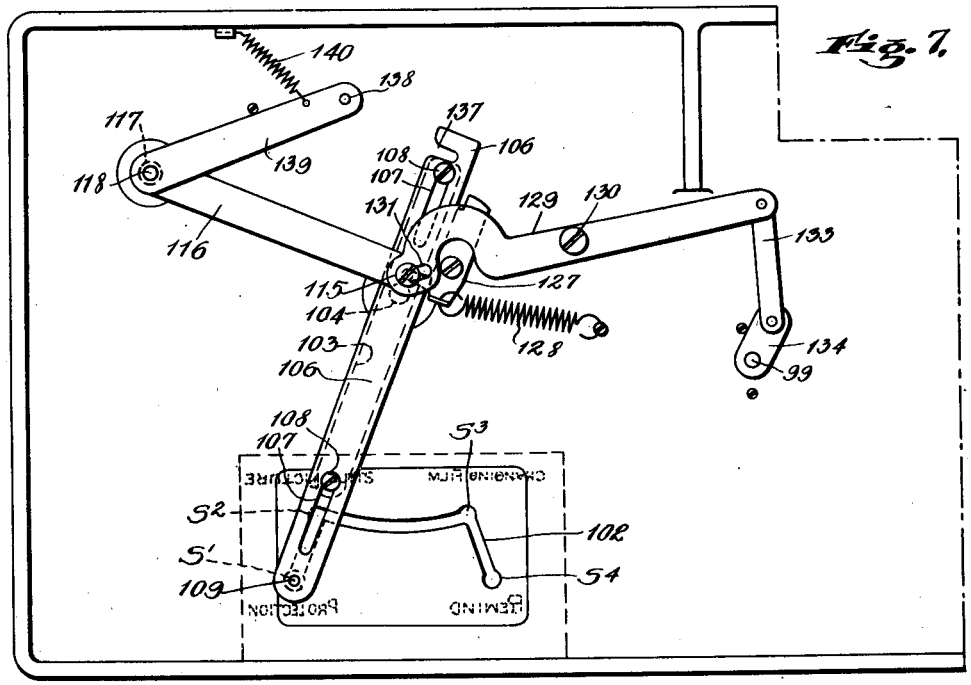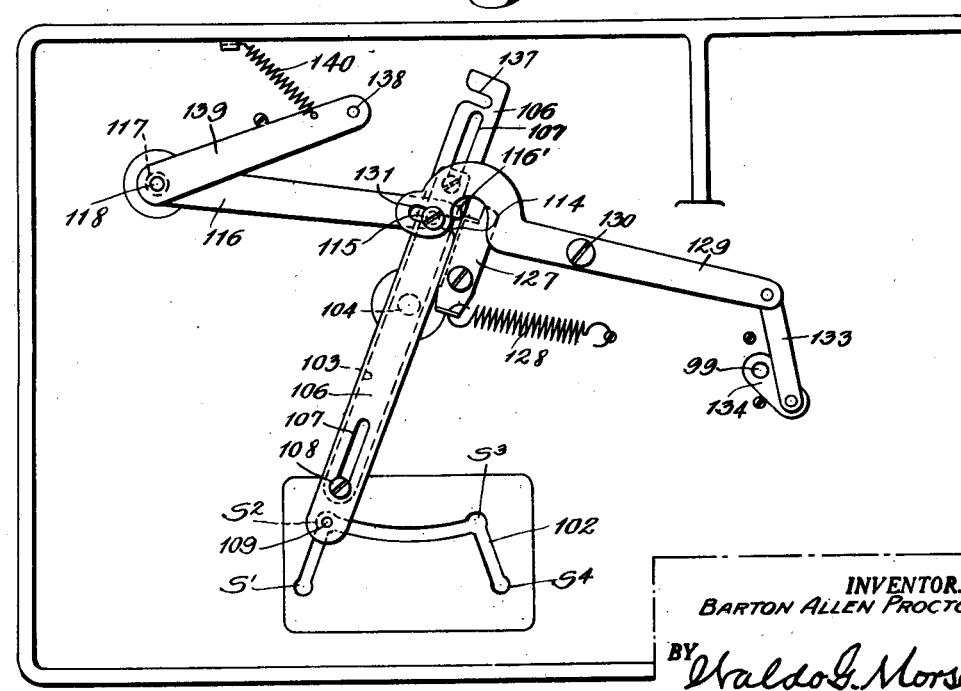

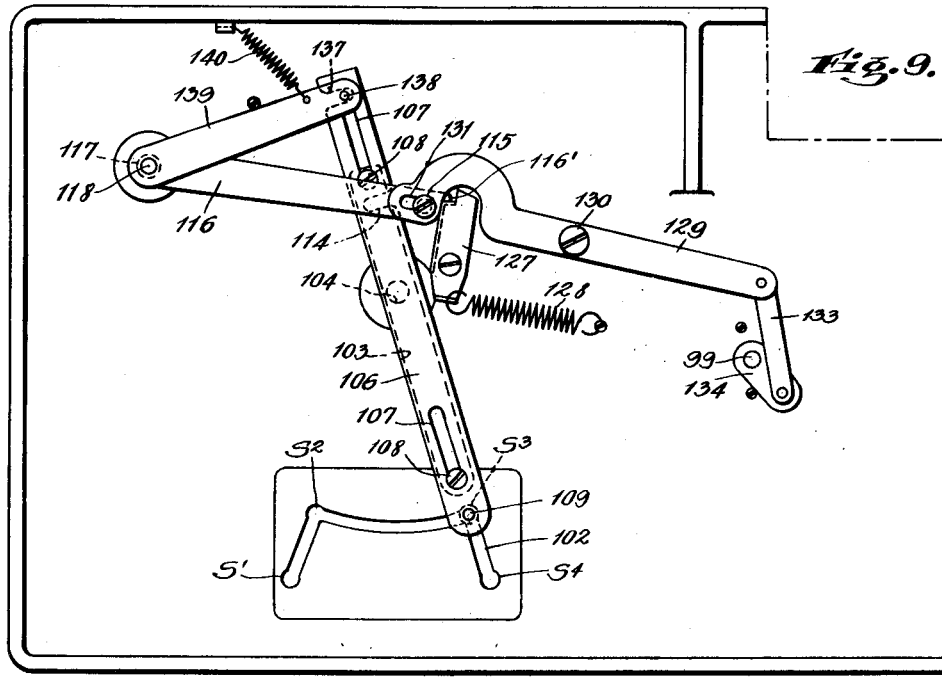
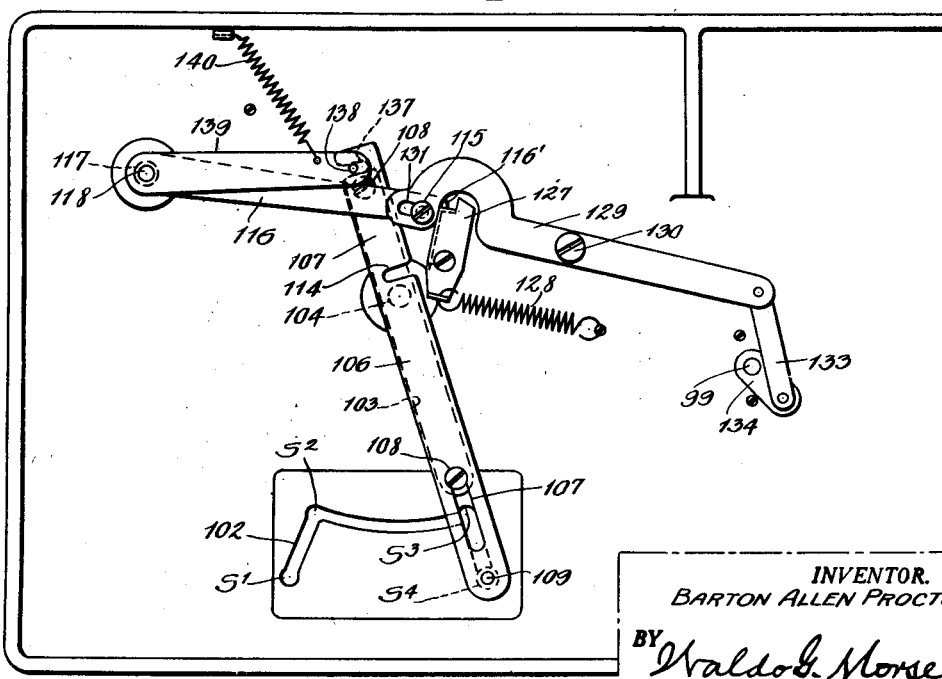

Patented Jan. 16, 1934

1,944,037

UNITED STATES PATENT OFFICE 1,944,037

FILM HANDLING AND APPARATUS THEREFOR

Barton Allen Proctor, Pelham Manor, N. Y., assignor, by mesne assignments, to Kinatome Patents Corporation, New York, N. Y., a corporation of New York Application March 20, 1929. Serial No. 348,633

69 Claims. (Cl. 88—17)

The present invention relates broadly to an apparatus for the handling and feeding of material, and more particularly to an apparatus adapted for the positioning, handling and feeding of film whereby the film is automatically placed in complete operative relation with the mechanism and different characteristic feeding movements thereof in either the same or different directions obtained at will.

The present application is a continuation in part of my co-pending application, Serial Number 54,910, filed September 8, 1925, which upon January 24, 1933, matured as Patent Number 1,894,963, and a continuation in part of my co-pending application, Serial Number 187,980, filed April 30, 1927.

Apparatus as heretofore provided has required the accurate manual positioning of the film with reference to the feeding mechanism as a prerequisite to the operation of such mechanism. It is one of the objects of the present invention to provide a film handling and feeding mechanism of such nature as automatically to effect proper positioning of the film upon such a bodily movement thereof as is required properly to place the same in the apparatus. Thus any manual positioning of the film apart from the preliminary bodily movement thereof is rendered unnecessary, thereby insuring uniformity, safety and ease of operation.

Another object of the present invention is to provide a film handling and feeding mechanism effective for producing in predetermined sequence certain operations previous and subsequent to the operation of the normal feeding mechanism. Such previous operations may comprise the complete initial positioning of the film with respect to the film feeding mechanism and to the openings wherein it is to travel, and the commencement of a characteristic feeding movement of the film in advance of the normal feeding movement thereof. Such subsequent operations may include the complete removal of the film from the normal feeding mechanism and its protection therefrom and its rewinding by feeding mechanism of different characteristics.

The invention further has for one of its objects, provision of improved means effective in timed relation to certain of the cycles of operation for effecting the preliminary positioning of the film regardless of succeeding operations to be performed thereon.

Another object of the present invention is the provision of mechanism automatically effective for producing the various characteristic movements of the film as desired, whether in one direction or the other of such construction that at all times the tension to which the film is then subjected shall constitute a condition precedent or incident to the proper operation of such mechanism.

A further object is the provision of mechanism capable of performing automatically the various film handling operations in the sequence which is desired or necessary for the particular purpose in mind. A further object is the provision of unitary control means for a film handling apparatus. A further object is the provision of mechanism adapted to safeguard the film.

Other advantages and characteristics are made apparent in the following description, the attached drawings and the subjoined claims. Although I am showing one preferred embodiment of my invention, it will be readily understood that I am not limited to this particular construction as changes may readily be made without departing from the spirit of my invention or the scope of my broader claims.

Although I am showing my invention as applied to motion picture projecting apparatus, it will be understood that it can be applied broadly to any art in which material is fed, and that it is particularly useful in connection with the handling of films, whether light sensitive, for use with a camera or sound recording apparatus, or image bearing, for use in a motion picture or other projector, or with a sound reproducing instrument, or with an apparatus adapted for the simultaneous reproduction of visual images of things and sound.

In the drawings:

Figure 1 is a right side elevation of the machine, certain parts of the lamp housing being broken away;

Figure 2 is a left side elevation of the machine;

Figure 3 is a right partial side elevation broken away to show actuating parts in film threading position, and illustrating the shutter or main feeding clutch;

Figure 4 is a partial left side elevation broken away to show actuating parts in film threading position;

Figure 5 is a cross section on a line V—V of Figure 2 looking in the direction of the arrows;

Figure 6 is a partial view taken on the line VI—VI of Figure 1 showing the right side only to illustrate the gate;

Figure 6A is a detail view of the gate rod crank lever and associated parts;

Figure 7 is a partial bottom plan view showing actuating levers in "normal intermittent projection" position;

Figure 8 is a partial bottom plan view showing actuating levers in "still projection" position;

Figure 9 is a partial bottom plan view showing actuating levers in "film threading or changing" position;

Figure 10 is a partial bottom plan view showing actuating levers in "rewind position";

Figure 11 (Sheet 4) is a detailed view showing segment and pinion for actuating film-stripping shield;

Figure 12 (Sheet 4) is a front view of same, showing a sprocket adapted for use with a film having side perforations.

Figure 13 (Sheet 5) is a wiring diagram of the apparatus.

Figure 14 (Sheet 3) is an enlarged detail view showing the positioning element in the locked position;

Figure 15 (Sheet 3) is a partial enlarged detail view showing the positioning element in inoperative or open position;

Figure 16 (Sheet 3) corresponds to Figure 15 except that a variation of the invention is shown in which the positioning element is provided with lost motion so that it becomes completely operative before the gate is completely closed;

Figure 17 (Sheet 3) is an enlarged detail view of the positioning mechanism corresponding to Figure 1 but showing the parts in relationship which is assumed when the positioning element is inoperative.

Certain of the features of the present invention, and more particularly those involving the automatic means for producing and maintaining the desired tension on a film, are shown and claimed in the copending application of Clarkson Ulysses Bundick and myself, Serial Number 44,482, filed July 18, 1925.

In carrying out the present invention there may be provided an apparatus comprising a supporting base B having mounted thereon a lamp L and resistance containing housing H and a supporting frame F upon which are mounted the operating parts of the film feeding and controlling mechanism per se.

Preferably carried by the frame F and projecting from one side thereof in predetermined spaced relationship are two reel receiving spindles 2 and 3, the spindle 2 being adapted for the holding of a reel of film during the feeding movement thereof and adapted to effect rewinding of the film at the conclusion of the feeding movement, while the spindle 3 is adapted during the feeding movement to be positively driven for coiling the film as required.

The film itself may be carried in a combined storage and exhibiting container comprising a pair of containers 4 and 5 having a pivotal connection 6 whereby the containers may be relatively separated to a predetermined extent to expose a desired length of film therebetween, or it may be supported in any appropriate manner.

The spindle 3, which will hereafter be referred to as the driving or take-up spindle, is journaled for rotation in a suitable bearing 7 in the frame F. The opposite side of the frame is formed with an enlarged boss 7ª through which the spindle extends, and beyond the boss there is secured to the spindle a combined brake drum 8 and friction driving member 9. The driving member 9 has a friction surface 10 with which a second friction member 11 in the form of a disk is adapted to cooperate. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14. Projecting rearwardly from the disk 11 is a circular series of driving lugs 15 conveniently in the form of closely spaced teeth or lugs 15 adapted to be engaged by a clutch hereinafter described in detail by means of which the driving spindle 3 may be frictionally rotated through the friction surfaces last above described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M through a flexible coupling 23 of any desired or unusual construction. By reason of this mechanism, it will be apparent that when the motor M is operated the shaft 18 will be positively driven through the worm and wheel before referred to. For transmitting this rotational movement from the shaft 18 to the spindle 3 at will, there is provided a sleeve 24 secured in any desired manner to the inner end of the shaft 18 and having slidably mounted thereon a collar 25 from which project pointed pins 26 slidable through the enlarged end 27 of the sleeve 24. By moving the collar 25 to the right as viewed in Figure 5, the pins 26 are projected to bring their pointed ends into engagement with the driving lugs 15 whereby a positive drive is immediately established for the driving spindle. This clutch will hereinafter be referred to as the driving or take-up spindle clutch.

The spindle 2, which will hereinafter be designated the rewinding spindle, or, when the context makes such phrasing desirable, as the delivery or supply spindle, is mounted similarly to the driving spindle 3 in a bearing 28 carried by the frame F, an enlarged boss 28' being provided coaxial with such bearing and spindle, and has secured to one end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch which may be generally similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31 there is provided a collar 31' pinned to the shaft 31 and bearing against a flat spring 36' which forces a fibre disk 37' against a face of a pulley 37. The pulley 37 is mounted in line with a similar pulley 38 mounted on the outer end of a stub shaft 39 secured in the bracket 16. Also mounted on the shaft 39 is a spur gear 40 adapted to be driven by a similar, but preferably larger, gear 41 on the outer end of the shaft 18. It will be apparent that, by passing a suitable belt around the pulleys 37 and 38, the shafts 18 and 31 may be simultaneously rotated by the motor M, the shaft 31 preferably revolving at a higher speed than the shaft 18, and that rotative movement in turn may be imparted through either of these shafts and by suitable operation of the controlling clutches, to the respective spindles with which they are in alignment.

It will readily be understood by those skilled in the art that this provision of a yielding drive for the shaft 31, especially in combination with the belt and pulley drive, prevents the forward or "leader" end of the film which is attached to the take-up spindle 3 being torn loose therefrom at the conclusion of the re-winding cycle.

Mounted on the frame F adjacent the motor M is a substantially right angled gate section 42 preferably secured in any desired manner as by screws 43 against movement relatively to the frame. This section is preferably formed with an aperture 44 through which light may be projected as well understood in the art, and with a film guiding depression 45 extending lengthwise of the section and intersecting the opening or aperture 44 for the travel of the film, such film guiding depression being relatively deep. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. By reason of this construction, it will be apparent that when the rod 48 is moved to the left as viewed in Figure 1 it will be effective for moving the section 46 away from the section 42 to permit the removal of a film and the insertion of a new film, while movement in the opposite direction will bring the sections into cooperative relation.

For effecting the desired intermittent feeding motion of a film in position in the gate, there may be provided a feeding sprocket 50 having film engaging teeth 51 adapted to engage apertures substantially peripherally positioned in the film f. This sprocket is mounted on a shaft 53 extending transversely through the frame F and carrying at its opposite end a star wheel 54. This star wheel, which may be of any well known construction, is adapted to be intermittently driven by means of a sectional cam 55 secured adjacent one end of a shutter shaft 56 journaled at one end of a grease casing C within which are mounted the sectional cam 55 and star wheel 54, and at its opposite end journaled in a suitable bearing 57 carried by a bracket 58 projecting from the frame F.

Mounted loosely upon the shaft 56 adjacent the opposite end thereof, as illustrated in detail in Figure 3, is a pulley 59 with a long bearing 60 upon which is mounted the driving collar 61 from which project forwardly the clutch pins 62 through appropriate openings in the pulley 59. Pinned to the shaft 56 there is provided the driven collar 63 to which there is attached one end of the spring 64, the other end of the spring being attached to the clutch element 65 to which there also is attached the driving block 66, the left hand end of which, as viewed in Figure 3, being preferably wedge-shaped so as to slip by the end of the clutch pins 62, if the pins and block should happen to be co-axial when brought toward engagement.

Intermediate the gate section 42 and the objective lens O the shutter 68 may be positioned. This shutter may be mounted as in the casting 293 adapted to be secured directly to one side of the main frame F and over a shaft receiving extension 294 passing through an opening 295 in the frame.

Mounted in the extension 294 is a shaft 295 carrying at one end a spiral gear 297 adapted to mesh with a suitable gear 298 on the shaft 56, preferably positioned within the casing C. The opposite end of the shaft 296 extends into an enlargement 299 and is provided with a spiral gear 300 meshing with a suitable gear 301 on a longitudinally extending shaft 302. The shaft 302 at one end carries the shutter 68 which may be secured in position by the driving disk 303. The casting 293 may be shaped to receive the objective lens holder 292, supporting the objective lens O, or such holder, as illustrated in Figure 1, may be attached directly to the frame F. It will be understood that the lubrication for the shafts 296 and 302 and the gears 297, 298, 300 and 301 is provided by the solidified oil or other suitable lubricant which fills the box C in which the cam 55 and the star wheel 54 are mounted.

Secured to the end of the driving shaft 21, and preferably substantially in line with the pulley 59, is a pulley 69 around which may pass a belt 70 from the drive shaft for driving the pulley 59. By reason of this construction, it will be apparent that when the collar 61 and the pins 62 are moved to the right as viewed in Figure 3, the inertia of the spring 64 will be absorbed and after a period of dwell rotation imparted to the shutter shaft 56 from the driving shaft 21, such rotation being effective for operating the shutter and for obtaining the desired intermittent operation of the film feeding mechanism.

It will readily be understood that rotation is not imparted to the shaft 56 and hence to the intermittently moving sprocket 50 until after the shaft 18 has been actuated. Power is directly communicated from the motor M through the coupling 23, shaft 21, worm 20 and worm wheel 19 to the shaft 18 and to the take-up spindle 3 through the previously described clutch, which is immediately operative. Power is communicated to the sprocket 50 through the intermittent train, to which reference has been made, the shaft 56, the previously described inertia-absorbing clutch, pulley 69, belt 70 and pulley 59, the latter being secured to power shaft 21. As a consequence it is apparent that even if both clutches should be rendered simultaneously operative the spindle 3 will begin to revolve before movement is imparted to the intermittent sprocket 50, to which reference has been made. It will be understood that the construction of the spring 64 may be such as to permit whatever period of dwell may be desired as the power is applied. Such timed relationship so provided is important since it draws the film f over the teeth of the sprocket and seats the same in the film perforations before the sprocket is placed in rotation, by such means as a result avoiding injury to the film and minimizing wear upon it.

Cooperating with the sprocket 50 and normally occupying the position illustrated in Figures 1, 11, and 12 of the drawings, is a stripping shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod, to the left as viewed in Figure 1, for the purpose of opening the relatively separable gate sections, will effect rotation of the rack in a counter-clockwise direction as viewed in that figure, thereby rotating the shield in a clockwise direction. This rotational movement of the shield will be effective for engaging the film *f* and stripping the same from the sprocket preparatory to the removal of the film from the apparatus. It will remain in such position covering certain of the teeth of the sprocket during the insertion of a new film or during rewinding, whereby the operation of threading the film is greatly expedited, or the film protected during rewinding, as the case may be.

For further assisting the threading movement, the relatively fixed gate section 42 is provided with a projecting guide 80 having a generally curved contour for gradually guiding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Preferably projecting from one end of the movable gate section is a shoe 85 curved to conform generally to the curvature of the sprocket 50, the contour of the inner surface accommodating the teeth 51 of the sprocket. These guides and shoe cooperate in a manner, as will be readily apparent from the drawings, to permit a film to be positioned between the gate member by merely moving the same edgewise laterally relative to its normal direction of travel through the gate. The movement of the shoe 85, later described, is effective to place the film in operative contact with the sprocket 50. This greatly lessens the time required for threading new film into position, and enables the operation to be performed satisfactorily by an unskilled operator.

In order entirely to obviate the necessity of manually producing slack or loops as heretofore required, there is provided a tension control means of the general character set forth in the co-pending application before referred to of said Bundick and myself. This tension control preferably includes braking means automatically operated by the film, and comprising a brake shoe 86 cooperating with the brake drum 29 on the rewinding spindle 2 and a brake shoe 87 cooperating with the brake drum 8 on the driving spindle 3 (Figure 4). The brake shoe 87 by means of the resilient member 87' is attached to a curved lever 92 secured to a plate 93 loosely surrounding the boss 7ᵃ on the frame F whereby the plate as a unit may be rotated around the boss. At its opposite end the curved lever 92 is provided with a film guide 94, preferably constructed of a flat spring, projecting through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved end 84 of the guide member 83 as to insure the passage of a film around the guide 94 automatically upon lateral movement of the film, while the guide 90 occupies such a position with respect to the inclined curved upper end 82 of the guide member 80 as to insure passage of a film over and around the guide 90 by the operation referred to.

As power is applied to the sprocket 50, the sprocket revolves and the film is pulled from the spindle 2, the arm 88 is depressed and energy is stored in the spring 96. This movement of the film may be cushioned by the operation of the flat spring 90. While the sprocket 50 is at rest, the spring 96 acts on the arm 88 to cause an amount of the film to be pulled from the spindle 2. The magnitude of the flat spring 90 may be so determined that it will assist in the above described auxiliary feeding operation. Upon the next rotation of the sprocket 50, the film is again fed forwardly, the portion necessary to compensate for the displacement caused thereby being the length of film previously pulled from the spindle 2 and such as at that moment is pulled from the spindle 2. This movement of the film F again moves the arm 88 to store power in the spring 96 which is used during the next period of rest of the sprocket 50 to pull more film from the sprocket 2, and the foregoing cycle is repeated throughout the entire period of operation.
In addition to the operation above described, the lever 88 and its associated parts perform a braking function. The lever 88 is normally swung in such direction as to bring the brake 86 into contact with the drum 29 by means of the spring
96. Due to the action of this spring, the brake 86 tends to prevent too free rotation of the rewinding shaft and thereby prevents the tension on the film becoming less than that required for proper feeding. In the event, however, of a tendency toward too great tension, the tension on the film causes the lever 88 to move in opposition to the action of the spring 96, thereby relieving the braking action of the brake 86 to a corresponding extent and reestablishing the predetermined tension on the film.

The operation of the arm 92, the yielding film pad 94, the take-up spindle 3 and the sprocket 50 is analagous to that of the elements between the sprocket 50 and the supply spindle 2 above described. As the sprocket 50 revolves, a portion of the film is moved forward. The resilient end of the spring arm 87' aided if desired by the resilient pad 94, holds the film constantly under tension. The spindle 3, yieldingly but continuously driven, pulls the film onward and coils it up. This operation tends to move the arm 92 against the pressure of the spring 87', and tends, also, to compress the flat spring 94. Thus, there is stored an amount of energy which is sufficient to move the film away from the sprocket and to maintain the tension upon the film f during the next period of rest of the sprocket 50. As the spindle 3 revolves during the period of rest of the sprocket 50, a direct pull upon the perforations of the film seated upon the teeth 51 of the sprocket is prevented by the cushioning effect of the spring 94 offsetting the frictional drive of the spindle 3.

In addition to the auxiliary feeding operation above described, the arm 87' with its associated parts performs a braking function.

The lower brake 87, is normally so positioned as to exert little braking action on the drum 8. In the event, however, of a tendency toward undue tension on the film between the feeding sprocket 50 and the reel carried by the driving spindle 3, the film will be effective to swing the lever 92 in such direction about its pivotal mounting 97 on the plate 93 as to bring the brake 87 into more effective braking engagement with the drum 8. Due to the fact that the spindle 3 is driven from the motor through a friction drive, such braking action will be effective for decreasing the driving force on the spindle 3, and consequently will relieve the tension on the film and produce the desired operating conditions between the sprocket and the lower reel.

The braking operation above described is of great usefulness where abnormal conditions of feeding arise, such for example as the binding of a shaft from any cause, as lack of lubrication or the intrusion of a piece of grit, or sudden acceleration or deceleration of the intermittent sprocket 50 owing to a sudden change in the voltage applied to the motor M or other temporary aberration characteristic of feeding. Applicant has been able successfully to feed film without the use of the braking means in addition to the primary tension controlling means but he prefers to use both means.

In the manner described required tension on the film to insure proper feeding is automatically secured by the mere threading of the film into position, and is automatically maintained by the operation of the tension or braking mechanism.

It will be understood, however, that the present invention may be utilized in connection with continuous feeding, with optical rectification of the image, or in connection with the feeding method employing the conventional unsupported loops of slack film.

When the apparatus is utilized for so-called "still" projection of pictures and in connection with film threading or film rewinding, it is desirable or necessary to provide means in the path of travel of the light rays for protecting the film against danger of injury by reason of undue temperature conditions. For effectively shielding the film during such periods, there is provided a trap or shield 98 composed of suitable material such as copper screen of suitable mesh carried by a shaft 99 having one end journaled in a bearing 100 projecting from the frame F and having its other end suitably journaled in the supporting base B. This shaft is adapted to be periodically operated in accordance with the character of operation of the machine, for bringing the shield positively into position when the apparatus is operating for the still projection of pictures or when a film is being threaded or rewound and to throw it out of position for the projection of pictures in motion.

It will be readily understood that when the apparatus is in film threading position, with the gate open and the tension control members in inoperative position cooperating with the guiding members associated with the gate and with the shield associated with the sprocket, a definite path is provided for the film between the spindles 2 and 3, into which path the film can be placed with one bodily movement thereof. In many cases, the operator with this one movement places the film completely in such film track, but if he is careless, hasty or unskilled, he may not move it completely within the track in all its parts. Therefore, I have provided lateral positioning mechanism which automatically brings the film completely into the film track and into the proper operating plane thus automatically carrying out one of the important parts of the threading operation, after the user has placed it within the general area of the gate, and retains it therein.

As will be apparent from Figures 1, 6, 14 and 15, there are provided film positioning or threading fingers 201 of such nature that when retracted they lie entirely within the recess 202 within the area of the gate section 80. Suitably attached to the fingers 201 is a connecting rod 203, to which movement may be applied through operation of the arm 204. Inserted within an opening 205 therein is the link 206 which in turn is attached to the lever 207 having a pivotal mounting 208 carried by the bracket 209 projecting from the gate section 42. The end of the lever 207 opposite to that to which the link 206 is attached, may be turned substantially at right angles to the body portion to furnish an angular portion 210 provided with an opening 211 for the reception of pin 77 previously described as carried by the rod 48.

By reason of this construction, it will be apparent, when the rod 48 is moved to the left as viewed in the drawings, it will be effective for rotating the lever 207 in a counter-clockwise direction and effecting thereby a similar rotational movement of the fingers 201 from the locking position shown in Figure 14 into the inoperative position shown in Figure 15. As such fingers 201 move into a position substantially normal to the longitudinal axis of the rod 203, and within the limits of the gate section 80, the gate section 46 is moved relatively to the section 42, thus opening the gate and permitting the removal of a used film and the insertion of another film.

Movement of the rod 48 to the right, however, will perform the opposite function. The fingers 201 will be rotated clockwise simultaneously with the closing of the gate and the movement of the shoe 85 whereby they will tend to sweep completely into the gate and into the film path generally, any film which may have been positioned within the general area of the gate and thereby keep such film locked in position until the rod 48 is again operated.

In many cases, however, it is desirable to force the film completely into its path well in advance of the complete closing of the gate. In Figures 1, 16 and 17, there is illustrated a modified embodiment of the invention by means of which such an operation may be accomplished. In such modification the right angled portion 210' of the lever 207' is substantially arcuate and adapted to receive a relatively long slot 211' in which the pin 77 moves. The opposite end of such lever 207' is connected to the link 206 in any desired manner, the link 206, however, being preferably continued beyond the plane of such lever 207' to provide a post 212 for cooperation with a tension spring 213 so positioned as to snap the lever 207' in one direction or the other after it has been moved a predetermined distance in such direction, the elongated slot 211' constituting a lost motion connection between the parts. The spring 213 thus becomes effective for quickly and rapidly completing the travel of the fingers 201 to their completely closed position before the rod 48 has traveled sufficiently completely to close the gate. It will thus be seen that in an apparatus making use of this construction, there are provided positive means for completely laterally positioning the film before it is possible for the gate sections to reach their closed position.

It will be readily understood that such provision of lateral positioning and locking members, effective before the gate is completely closed, is also of great usefulness in apparatus of the type in which the initial positioning of the film is along its normal path of travel through the apparatus.

I preferably provide a control mechanism for the operation of the rod 48 and hence of the positioning and locking fingers 201 in timed or sequential relation to the other parts of the threading operation, such as the clutching and declutching of the intermittently moving means, to the clutching and declutching of the rewinding means, to the movement of the stripping and protective means into and out of operative relationship respectively, and to the starting and stopping of the shutter, and the movement of the heat shield into and out of operative relationship, as well as to the opening and closing of the gate and the actuation of the shoe as set forth above. Such timed or sequential operation is extremely important to a completely automatic or "fool proof" film handling apparatus in which the threading and related operations are automatically carried out.

For controlling the operation of the apparatus in the manner desired, there is preferably provided a single control member in the form of a knob or button 101 projecting through a substantially U shaped slot 102 in the supporting base B. This slot is so shaped as to provide four operating stations designated, respectively, S1, S2, S3 and S4. The button 101 is adapted to be moved at will so as to occupy any one of these stations. With the button at the station S1, the respective parts of the apparatus are in such position as to insure the normal projection of pictures in the usual motion picture manner. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The control mechanism actuated by the control knob is to a large extent shown in Figures 7, 8, 9 and 10 inclusive, which illustrate in succession the changes in the position of the parts of the control mechanism by movement of the control button successively to the respective stations. Such mechanism may comprise a lever 103 keyed or otherwise secured to one end of a brake release rod 104 journaled in any desired manner in the base B, the other end being journaled in a bearing bracket 105. Being secured to the brake release rod 104 which is capable only of a turning movement about its longitudinal axis, the lever 103 is restricted in its movement to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At one end the lever 106 carries a pin 109 having a head 110 against one side of which bears one end of a compression spring 111. The opposite end of this spring bears against a flange 112 extending inwardly from the control button 101. By reason of this construction it will be apparent that the button may be moved axially on the pin 109 but that the spring 111 will normally be effective for urging the button toward the base B. The button has a collar 113 of a diameter to substantially conform to the contour of the slot 102 at the respective operating stations, whereby with the button in its normal position accidental movement from one of these stations is prevented.

At a point intermediate its length the combined rotating and sliding lever 106 is provided with a transversely extending recess 114 adapted to cooperate with a pin 115 projecting from a lever 116 which is secured adjacent one end of the control sleeve 117 surrounding a control rod 118, the sleeve and rod extending through the base B and journaled for rotational movement in bearings 119 carried by the bracket 16 and by a bearing 120 carried by the bracket 33. Adjacent one end, the control sleeve 117 has projecting therefrom forked operating arms 121 carrying projecting pins 122 adapted normally to lie in the groove 123 of the clutch member 62 on the shutter shaft 56. By reason of this construction it will be apparent that upon rotation of the sleeve 117 in a counter-clockwise direction, as viewed in Figure 7, the clutch pin 62 and the block 66 will be disengaged, thereby destroying the driving relationship between the main drive shaft 21 and the shutter shaft 56.

At an intermediate point the control sleeve is provided also with a similar pair of arms 124 having pins 125 normally projecting into the groove 126 of the clutch collar 25. Rotation of the sleeve in a counter-clockwise direction as just described will be effective through the arms 124 for disengaging the driving spindle clutch thereby to permit the driving spindle to move freely in either direction. Engagement of the driving spindle clutch and the shutter shaft clutch will be effective for the so-called projection of pictures in motion but this engagement is not required for still or stereopticon results. Such operation of the sleeve 117 is obtained by moving the control button from station S1 to station S2, or from the position shown in Figure 7 to the position shown in Figure 8, by reason of the relative movement imparted to the sleeve due to the sliding action of the lever 106.

In order to assist in the actuation of the take-up spindle clutch in advance of the clutch controlling the sprocket 50, the position of the arms 122 and 124 relative to the axis of the control sleeve 117 and to each other may be such that the clutch pins 26 become effective for driving the spindle 3 almost immediately with the movement of the control button 101 away from station S2 toward station S1 while the pins 62 do not move into the path of the block 66 and hence are not positioned to begin to absorb the inertia of the spring 64 until the travel of the button 101 to station S1 has been completed.

Pivotally mounted adjacent the side of the combined sliding and swinging lever structure is a detent 127. One end of this detent has connected thereto one end of a tension spring 128, the opposite end of which is secured to a suitable projection on the base B of the apparatus. The spring normally tends to swing the detent in a counter-clockwise direction about its pivotal mounting as will be apparent from the drawings.

It will be readily understood that at the conclusion of the projection cycle, although the control mechanism may remain in the position described above, the film is protected from injury. The driving spindle continues to rotate, but the frictional driving connection for the driving spindle 3, previously described, materially lessens the strain upon the film.

In changing from the normal projection to the projection of still pictures, it is also necessary or desirable to move the shield or screen 98 into position. This is positively accomplished simultaneously or in timed relation with the rotation of the sleeve 117, through the medium of a lever 129, pivoted at its intermediate portion on a stud pivot 130, secured in the base B. At one end the lever 129 has a slot 131, within which projects the pin 115 on the lever 116. At its opposite end, the lever 129 is pivotally connected to a link 133, the opposite end of which is connected to a crank arm 134, secured to the lower end of the shaft 99. The opposite end of the lever 129 is curved to provide a recess, as clearly shown in the drawings, adapted to permit the desired operation of the detent 127 without interference therewith. Through the medium of the mechanism just described, the movement of the lever 106 from station S1 to station S2 will rotate the lever 129 in such direction as to swing the heat shield into light-intercepting position. It will be noted that this movement of the light shield takes place positively in timed relation to the movement of the operating parts necessary in obtaining still projection, and thereby eliminates any possibility of injury to a film from the heat of the light source while the film is stationary.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from Station S2 to Station S3. This movement will be effective only for rotating the brake release rod 104 and for bringing a recess 137 in the lever 106 into cooperative engagement with a pin 138, projecting from a lever 139, secured to one end of the control rod 118.

The lever 139 is normally held in the position shown in Figures 7, 8 and 9 by a tension spring 140, which may be secured in any desired manner to the base B of the apparatus. In this position, the pin 138 will be received by the slot 137 when the parts are rotated in the manner described.

At the commencement of the movement from Station S2 to Station S3, the combined swinging and sliding lever structure will be moved away from the detent 127, thereby permitting it to swing in a counter-clockwise direction under the influence of its tension spring. This movement will be effective for bringing the notched end of the detent into engagement with the projection 116' of the end of the lever 116, whereby the lever 116 and its associated parts will be held in the proper position.

The rotation of the brake release rod is effective for opening the gate, for moving the brakes 86 and 87 and their associated parts to inoperative position, for so actuating the stripper shield 71 as to effect the desired bodily removal of a film from the sprocket 50 or the shielding of the sprocket to permit the threading of a new film into position, and for moving the positioning and locking fingers 201 to inoperative position. These operations are obtained by securing to the upper end of the brake release rod a pin 141 extending into a slot 142 in one arm of a bellcrank lever 143, having a pivotal mounting 144 on the frame F. The opposite end of the bellcrank lever is in co-operative engagement with one end of a link 145 movable through a slide or guide 146 and having one end bent to extend over the brake lever 88. Movement of the control button from the Station S2 to the Station S3 will be effective for rotating the brake release rod 104 in a counter-clockwise direction, as viewed in Figure 9, thereby rotating the bellcrank lever 143 in a counter-clockwise direction, as viewed in Figure 4, and consequently rotating the brake lever 88 about its pivotal mounting 89 in opposition to the spring 96 for moving the brake 86 to inoperative position.

Movement of the lower brake is obtained simultaneously with actuation of the upper brake through the medium of a crank lever 147, secured at an intermediate point to the brake release rod. As is clearly shown in Figure 6A, this crank lever has a slot 148 in its free end into which projects a pin 149 carried by the gate control rod 48. The right hand end of the gate control rod as viewed in Figure 3, is connected by a link 150 with the plate 93, whereby said plate and the gate control rod operate in unison. Movement of the brake release rod occasioned by operation of the control button from Station S2 to Station S3 is effective for rotating the plate 93 and all parts carried thereby in such direction as to move the film guide 94 in the slot 95 and bring it into such cooperative relation to the guides 80 and 83 as shown in Figure 3, as to facilitate the removal of a film or the positioning of another film. This movement of the gate control rod will also tend to separate the gate sections and will move the shield 71 into stripping and shielding position and to move the positioning and locking fingers 201 into inoperative position, as will be obvious.

If it is not desired to change a film, the control button may be moved from station S3 to station S4, or may be moved from station S2 to station S4 without stopping at station S3. This movement will be effective by reason of the engagement between the recess 137 and the pin 138 for rotating the control rod 118. At its free end, this control rod carries spaced arms 151, similar to the arms 121 and 124, previously described, and provided with pins 152, normally lying in the groove 153, in the rewinding clutch collar 36. The rotation of the control rod 118 as occasioned by the movement of the control button from Station S3 to Station S4 will be such as to move the rewinding clutch into operative position, whereby the spindle 2 is connected in driving engagement with the shaft 31, this engagement being such that the film may be rewound by the continued operation of the motor M. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

During this time, the spring 140 will be held under tension in such manner that should an operator fail to completely position the button at the Station S4, the spring will be effective for automatically restoring the parts to an inoperative position at Station S3.

From the foregoing, it will be apparent that the operation of a single control button performs in succession those changes in the operating positions of the various parts necessary for permitting any desired condition of operation of the apparatus. Upon movement of the control button from Station S4 to Station S3, the rewinding clutch will be disengaged and the lever 139 held in position by the spring 140. Upon movement from the Station S3 to the Station S2, the recess 137 will leave the pin 138 and the brake release rod 104 will be rotated in the opposite direction to that heretofore described.

During this movement, the combined swinging and sliding lever structure will come into engagement with the detent 127 and swing it in a clockwise direction against the action of its controlling spring 128, to thereby release the projection 116' from the holding action of the detent, and permit the lever 116 and its associated parts to be subsequently moved as required, upon movement of the control button from Station S2 to Station S1. Such movement of the button will swing the lever 116 in the opposite direction to that previously described, and thereby effect re-engagement of the main or shutter clutch and of the driving spindle clutch. At the same time, lever 129 will be restored to its original position, thereby, in turn, effecting movement of the heat shield to inoperative position.

Mechanism may be provided for the showing of successive still pictures. Such mechanism, as illustrated more particularly in Figures 2 and 5, may comprise a shaft 154 mounted in bearings 155 on the back of the frame F. At its lower end, this shaft carries a bevel gear 156 adapted to mesh with a similar gear 157 on the shutter shaft 56. Normally, the gears 156 and 157 are maintained out of engagement by means of a compression spring 158 effective for moving the shaft 154 upwardly. At its upper end, this shaft carries a knurled actuating nut or knob 159 which may be grasped at will by an operator, thus enabling him to bring the gears 156 and 157 into engagement for the slow rotation of the shutter shaft. Such rotation will be effective to "frame" an image, if desired. At this time it will be understood that the control button will occupy a position at Station S2.

Carried by the frame F and positioned in line between the filament of the light source L and the aperture 44 of the gate is the condensing lens casing 161 which supports the condensing lens 161'. This condensing lens as is usual in the art concentrates the light upon the aperture.

The combined lighting resistance and ventilating unit is contained within the housing H. Within this housing is mounted in any desired manner a lamp L adjustably carried by a bracket 162 having pivotal mounting 163 in a bracket 164. Also having a pivotal mounting in the bracket 164 is a reflector R.

Secured to one side of the housing is a resistance carrying unit 165 providing a suitable resistance for the lamp L. Mounted on back of the base B is a second resistance 166 with which cooperates a control finger 167 operated by a rod 168 and a button 169, conveniently positioned as upon the front of the apparatus, adjacent the control button 101, by means of which resistance may be cut into or out of the motor operating circuit at will.

A fan 169' operating within a housing 170 and attached to an extension 171 of the armature shaft of the motor M is continuously effective throughout the periods of operation of the apparatus for ventilating the lamp house and the parts therein.

Figure 13 illustrates the wiring of the apparatus.

Certain of the advantages of my invention have been stated in the above portion of this specification. Other advantages include the provision of method and means whereby all the operations of a film handling apparatus may be automatically instituted and carried out, with minimum effort and skill on the part of the operator and minimum likelihood of damage to the film.

A motion picture film is a ribbon of light sensitive or image bearing material of a breadth many times its thickness. In cross section, therefore, a film would properly be represented by a rectangle, two sides of which would be represented by long parallel lines and the other two sides of which would be represented by relatively vastly shorter parallel lines joining the long parallel lines. The relatively long lines indicate a dimension of 35 or 16 millimeters and the relatively short lines a dimension of about six one-thousandths of an inch. In the subjoined claims, the word "edge" is used to indicate a portion of the film which would be indicated in the above described diagram by one of said relatively very short parallel lines. Also, as applied to the film path, the word "edge" indicates the portion corresponding to the above defined "edge" of the film.

I claim:

1. In a film handling apparatus, a plurality of film engaging means having a path of travel for a film therebetween, means adapted to position the film in said path of travel, means adapted to feed the film along said path from one of said engaging means to another, mechanism adapted to drive said feeding means, and mechanism interconnecting said positioning means and said driving mechanism for assuring the operation of said positioning means prior to the operation of said driving mechanism.

2. In a film handling apparatus, mechanism for feeding a film, a motor, means for operatively connecting said mechanism and said motor, means engaging an edge of the film for laterally moving the film into a pre-determined position relative to said mechanism, and a single means for controlling both of said previously mentioned means and effective for operating the same.

3. In a film handling apparatus, a member for feeding a film, a motor, means for operatively connecting said member and said motor, presser means for moving the film from a pre-determined position between said presser means and said feeding member and into operative relation with said member, means movable relatively to both said presser means and said feeding member for moving the film into such pre-determined position, and control mechanism, said control mechanism including a movable actuating member and mechanism connecting said actuating member with all of said previously mentioned means for operating said positioning means whereby, first, the film is moved into such position between said presser means and said feeding member upon the first portion of the movement of said actuating member and for operating said presser means for moving the film from such position into operative relation with said feeding member upon the succeeding portion of such movement of said actuating member and for operating said means for operatively connecting said member and said motor upon the next succeeding portion of such movement of said actuating member whereby, the film having been automatically positioned thereupon, said feeding member is operated and the regular feeding operation of the film carried on.

4. In a film handling apparatus, a member for feeding a film, a motor, means for operatively connecting said member and said motor, means for moving the film in one direction for the purpose of bringing it within a pre-determined position relative to said member, means for moving the film in a direction approximately at right angles to such previously mentioned direction for the purpose of moving the film from such position and into operative relation with said member, each of said moving means being movable relatively to the other and to the film and a single control means interlocking all of said previously mentioned means and effective for operating the same.

5. In a film handling apparatus, a member for feeding a film, presser means for moving the film in one direction for the purpose of operatively positioning it upon said feeding member, positioning means for moving the film in a direction angular to such first mentioned direction for the purpose of moving it into a predetermined position in the space intervening between said presser means and said feeding member from a position outside of such space, and operating mechanism interlocking said presser means and said positioning means for successively actuating the same.

6. In a film handling apparatus, means for feeding a film, mechanism for operating said means, operable means for laterally positioning the film relatively to said feeding means, and control mechanism interconnecting said means and mechanism and necessarily rendering said positioning means effective before said operating mechanism can become effective.

7. In a film handling apparatus, a gate comprising a fixed section and a movable section, means movable relatively to both said sections for initially moving a film into a predetermined position between said sections, a member for feeding the film between said sections after such initial positioning, means for driving said member, and operating mechanism for both of said means, said operating mechanism including a movable actuating member and mechanism connecting said actuating member and each of said means for first operating said positioning means while maintaining said driving means ineffective upon said member during the first portion of the movement of said actuating member and thereafter rendering said driving means effective upon said feeding member upon a succeeding portion of the movement of said actuating member.

8. In a film handling apparatus, a gate including two sections defining a path of travel for a film therebetween, means for moving a film in a direction angular to such path from a space outside of that intervening between said sections and into such space for the purpose of initially positioning the film in said gate between said sections thereof, means for feeding the film between said sections after such initial positioning, and a single actuating mechanism interlocking both of said means.

9. In a film handling apparatus, a gate including a fixed section and a section movable relatively thereto to a position parallel therewith for defining a path of travel for a film therebetween and to a position relatively distant from said fixed section, means for moving a film in a direction angular to such path from a space outside of that intervening between said sections when said movable section is disposed in such distant position into the space intervening therebetween for the purpose of initially positioning the film in said gate, means for moving said movable section into cooperative relation with said fixed section, means for feeding the film between said sections after such initial positioning, control mechanism inter-locking all of said means, and a single actuating member for said mechanism.

10. Film feeding apparatus which comprises a revoluble toothed film feeding member, a movable member adapted to engage a film and move it in a direction substantially parallel to the axis of said feeding member and into a pre-determined position relative thereto, mechanism for operating said member, mechanism for removing the film from the teeth of said feeding member, and a single control means interlocking both of said mechanisms for successively operating each of the same.

11. In a film handling apparatus, a toothed member for feeding a film, a protective member for rendering the teeth of said feeding member inaccessible by the film, operating means for moving said protective member from and to protective position, a presser member for bringing the film into operative engagement with the teeth of said feeding member, positioning means for initially moving the film into the space intervening between said presser member and said feeding member, and control mechanism interlocking said positioning means and said operating means for said protective member and effective for actuating each thereof in timed relation.

12. Film feeding apparatus which comprises mechanism to feed a film, a member adapted to engage the edge of the film for laterally moving it into a pre-determined position relative to said mechanism, means to operate said member, means to bring the film into operative relation with said mechanism, a source of power, means to bring said mechanism into operative connection with a source of power, means to break such operative connection, means bodily to remove the film from said mechanism, and control mechanism interlocking all of said means and effective to operate each of the same.

13. In a film handling apparatus, an apertured gate, a light source which directs light upon the aperture of said gate, means cooperating with said light source to diminish the heat thereof effective upon a film at said aperture, means effective for laterally moving the film into correct position relative to said aperture, and control mechanism interlocking both of said means and necessarily effective to maintain said heat diminishing means in operative position until after said moving means has been effective for moving the film into such correct position relative to said aperture.

14. In a film handling apparatus, an apertured gate, a light source which directs light upon the aperture of said gate, means cooperating with said light source for diminishing the heat thereof effective upon a film at said aperture, means effective for moving the film into a pre-determined position relative to said aperture, means for feeding the film past said aperture, control mechanism interlocking all of said means, said control mechanism including an actuating member, a plurality of operating stations, and mechanism connecting said actuating member and said heat diminishing means, said positioning means, and said feeding means for operating said means for moving the film into such predetermined position and for maintaining said heat diminishing means locked in heat diminishing position and said feeding means inoperative upon the movement of said actuating member to one of said stations and for rendering said heat diminishing means ineffective and said feeding means operative upon the movement of said actuating member to another of said stations.

15. In a film handling apparatus, a film supporting member, a toothed member for feeding a film in relation to said supporting member, a member for bodily moving the film in relation to said feeding member, a spring for operating said moving member, means for applying the power of said spring to said member, a film engaging member disposed between said feeding member and said supporting member, said engaging member being mounted for movement between two positions at one of which that section of the film extending between said feeding member and said supporting member is disposed in a curved line and at the other of which such section of the film approaches the chord of such curved line, and an operating mechanism connecting said engaging member and said means for applying the power of said spring to said member, whereby said moving member is operated, upon the movement of said engaging member from one of said positions toward the other.

16. In a film handling apparatus, two film supports, means for intermittently feeding the film from one of said supports toward the other, said means including a member positioned between said supports and engaging the film, means engaging the film between said intermittent member and said supports and movable between one position wherein they define one side of a relatively short path between said supports and another position wherein they define one side of a relatively long path between said supports, means for moving said path-defining means from one of said positions to the other, means for bodily moving the film from a position outside of said path into the path so defined by said path-defining means, and control mechanism operatively interconnecting said means for moving said path-defining means and said means for moving the film into said path and effective for operating both of the same.

17. In a film handling apparatus, an idling delivery carrier, a continuously driven take-up carrier, a member for intermittently feeding a film from said delivery carrier toward said take-up carrier, means for initially increasing the length of the film extending between said carriers whereby a sufficient amount of film is initially provided between said carriers to allow for the compensation necessary because of the difference of character of movement of said carriers and said intermittent feeding means during the operation of the same, and operable means for initially positioning the film by moving it into the area of operation of said means for initially increasing the length thereof.

18. In a film handling apparatus, an idling delivery carrier, a continuously driven take-up carrier, means for intermittently feeding the film from said delivery carrier toward said take-up carrier, said means including a member positioned between said carriers and adapted to engage the film, means for initially increasing the length of film extending between said carriers whereby compensation for the difference in the character of the movement of said carriers and said intermittent member may be secured, positioning means for initially moving the film into operative relation with said means for increasing the length thereof, and sequential control means interconnecting said compensating means and said positioning means and effective for first operating said positioning means and thereafter for operating said compensating means whereby the film is automatically first placed in such relation with said compensating means that said compensating means may be operative thereupon and thereafter said compensating means is operated initially to increase the length of the film.

19. In a film handling apparatus, means for feeding a film through a pre-determined path of travel and means for bodily moving the film in relation to such path of travel, said moving means comprising a film engaging member, an operating shaft, said film engaging member being mounted upon said shaft and said shaft being disposed substantially parallel to such path, a spring for rotating said shaft whereby said member is operated, an operable control member, and a connection between said control member and said spring for applying the power of said spring to said shaft upon the operation of said control member.

20. In a film handling apparatus, a member for feeding a film along a pre-determined path of travel, a member for bodily moving a film relatively to such path, and mechanism for operating said moving member, said mechanism comprising a shaft upon which said moving member is mounted, a spring for rotating said shaft, a pivoted member, and an operating connection between said pivoted member and said spring for applying the power of said spring upon the movement of said pivoted member to said shaft whereby said moving member is operated.

21. In a film handling apparatus, a feeding member, a member for moving a film into a pre-determined position relative to said feeding member, a mounting for said moving member, and mechanism for rotating said mounting for the purpose of operating said member, said mechanism including a longitudinally movable rod, a toggle connected to said mounting, means connecting said rod and said toggle effective for initially breaking said toggle upon the first portion of the movement of said rod, said breaking toggle action being effective to partly rotate said mounting, a spring engaging said toggle effective to complete the breaking movement thereof rapidly after it begins, and means for moving said rod longitudinally to initially break said toggle.

22. In a film handling apparatus, a gate comprising a fixed section and a section movable relatively thereto, means movable relatively to both of said sections and effective for laterally moving a film into the space which intervenes between said sections when they are disposed in relatively distant relation to each other, and an actuating member operatively connected with said movable section and said moving means and effective for operating said means and moving said movable section into cooperative relation with said fixed section in timed relation.

23. In a film handling apparatus, an openable gate defining a path through which a film travels, a rotatable member cooperating with said gate for moving the film in a direction angular to such path of travel and into said gate, and control means for said gate and said rotatable member, said means comprising a movable actuating member and connections between said actuating member and said rotatable member for first operating said rotatable member and thereafter closing said gate.

24. In a film handling apparatus, an openable gate through which a film travels, operable means cooperating with said gate for laterally moving the film into a predetermined position therein, and operating mechanism interconnecting said gate and said means for operating said positioning means prior to the closing of said gate, said operating mechanisms including devices interposing a period of dwell between the film positioning and gate closing.

25. A gate defining a path for a film in a film handling apparatus, said gate comprising two sections, one of which is fixed and the other of which is movable from and to cooperative relation thereto, an auxiliary member bodily movable relatively to both of said sections into a position wherein it maintains the film in a predetermined cooperative relation to said sections, said auxiliary member being mounted for rotation upon an axis which is disposed adjacent one side of said fixed section and substantially parallel to the path of the film through the gate, and sequentially operable means interlocking said auxiliary member and said movable section whereby said gate, section and said member may be operated in a pre-determined timed relation.

26. In a film handling apparatus, an openable gate comprising a fixed gate section and a section movable into cooperative relation therewith, a film positioning member, a mounting for said member, an operating rod, means for moving said rod, and operating connections between said rod, said mounting and said movable section of said gate for first rotating said mounting whereby said member is bodily moved relatively to both of said gate sections and into cooperative relation therewith upon the first portion of the movement of said rod and for thereafter moving said movable gate section into such cooperative relation with said fixed section whereby said gate is closed upon the succeeding portion of the movement of said rod.

27. In a film handling apparatus, an openable gate, a member for moving a film into a predetermined position within said gate, a mounting for said member, and mechanism for rotating said mounting for the purpose of operating said member, said mechanism comprising an actuating member, means operatively connecting said actuating member and said mounting, and a spring engaging said means and controlled by said actuating member, the first portion of a predetermined movement of said actuating member rendering said spring effective to move said means and quickly rotate said mounting, further operative movement of said actuating member being ineffective on said mounting.

28. In a film handling apparatus, an openable gate, a member for moving a film into a predetermined position within said gate, a mounting for said member, and mechanism for rotating said mounting for the purpose of operating said member, said mechanism comprising a longitudinally movable actuating member, mechanism operatively connecting said actuating member and said mounting for rotating said mounting upon the longitudinal movement of said actuating member, and means for moving said actuating member.

29. In a film handling apparatus, an apertured gate which consists of two fixed members, one of which is positioned substantially at right angles to the optical axis of said gate and the other of which is positioned substantially parallel to such axis and at right angles to said first mentioned fixed section, such disposition of said fixed members being effective to define a first and second side of the path of the film through said gate, and two members bodily movable relatively to each other and to said fixed members, a first of said movable members including means for mounting it that it may be disposed in a cooperative position relative to both of said fixed members wherein it defines a third side of said path, the second of said movable members including means for mounting it that it may be disposed in a cooperative position relative to said first mentioned fixed member and said first movable member wherein it defines a fourth side of such path, and operating mechanism interlocking both of said movable members and effective by the operation for moving each of them from such positions in timed relation.

30. In a film handling apparatus, a member for feeding a film, a motor, means for operatively connecting said feeding member and said motor, pressure means for moving the film into operative relation with said feeding member, positioning means movable relatively to said presser means for moving the film into a predetermined position between said presser means and said feeding member, and a single means interconnecting all of said previously mentioned means and effective for operating the same.

31. In a film handling apparatus, an openable gate through which a film passes, said gate including a fixed section and a movable section, means movable relatively to both of said sections for initially moving the film into a predetermined position relative to said gate, means for closing said gate, mechanism for feeding the film through said gate, a source of power for said mechanism, means for bringing said feeding mechanism into operative relation with said source of power, and mechanism interlocking all of said means and assuring the operation of all of the same in timed relation.

32. In a film handling apparatus, a toothed member for feeding a film, an operable protective member for rendering the teeth of said feeding member inaccessible by the film, a presser member for bringing the film into operative engagement with the teeth of said feeding member, positioning means for initially moving the film into the space intervening between said presser member and said feeding member, and control mechanism interlocking said positioning means and said protective member and effective for operating said positioning means while maintaining said protective member in protective position.

33. Apparatus for the feeding of material comprising a plurality of carriers, guiding means cooperating therewith for defining a path of travel for the material between said carriers, braking means for at least one of said carriers, said braking means embodying a guide positioned adjacent such path over which the material is adapted to pass, a brake shoe cooperating with said carrier, and a connection between said shoe and guide whereby the tension of the material varies the effectiveness of said braking means upon its carrier, and mechanism for initially moving the material from a position outside of such path into such path and into operative position relative to said guide.

34. Apparatus for the feeding of material comprising a plurality of carriers, means for feeding the material therebetween, mechanism controlled by the material for determining the rate of rotation of at least one of said carriers, said mechanism including a member engaging the material between said carriers, guiding means cooperating with said member and with said carriers for determining the path through which the film is fed between said carriers, and mechanism for moving the material in a direction angular to such path of travel and into such path and into operative position relative to said film engaging member.

35. In a film handling apparatus, a film carrier, a member for feeding the film supported upon said carrier, means for controlling the tension of that portion of the film between said carrier and said feeding member, said means comprising a guide engaging such portion of the film, a supporting member for said guide, and a spring for urging said supporting member toward such path of travel, and a member for engaging the edge of the film for laterally moving the film into position within the area of operation of said guide, for the purpose of initially positioning the film.

36. In a film handling apparatus, an idling delivery member and a continuously operating taking up member, an intermittently moving film feeding mechanism disposed between said members for moving the film from said delivery member toward said taking up member, means for compensating for the difference in character of movement of said members and said feeding mechanism, said means including a member engaging the film between one of said previously mentioned means and said intermittent mechanism, guiding means cooperating with all of said previously mentioned members and said feeding mechanism for defining a path of travel for the film between said delivery member and said taking up member, and means for moving the film from a position outside of such path into such path and into the area of operation of said film engaging member of said compensating means, for the purpose of initially positioning the film preparatory to the film feeding operation.

37. In a film handling apparatus, an idling delivery reel, a continuously driven take up reel, an intermittently moving film feeding means disposed between said reels and engaging the film for feeding the same from said delivery reel toward said take up reel, mechanism for compensating for the difference in character of movement of said reels and said feeding means, said mechanism embodying a film engaging member, means for rendering said compensating mechanism operative upon the film, mechanism for initially positioning the film by moving it into the area of operation of said film engaging member, and control mechanism interconnecting said means for positioning the film in operative relation to the film engaging member which is embodied in said compensating mechanism and said means for rendering said compensating mechanism operative upon the film and effective for operating both of the same.

38. In a film handling apparatus, an idling delivery reel, a continuously driven take up reel, an intermittently moving film feeding mechanism disposed between said reels and engaging the film for feeding the same from said delivery reel toward said take up reel, mechanism for compensating for the difference in character of movement of said reels and said feeding means, said mechanism embodying a film engaging member, means for positioning the film in the area of operation of said film engaging member, means for rendering said compensating mechanism operative upon the film, and control mechanism for bo'h of said means, said control mechanism comprising a movable actuating member and connections between said actuating member and said positioning means and said means for rendering said mechanism operative upon the film for first operating said positioning means upon the first portion of the movement of said actuating member and thereafter actuating said means for rendering said compensating mechanism operative upon the film upon the succeeding portion of such movement of said member.

39. In a film handling apparatus, an idling delivery member, a continuously driven take up member, an intermittently moving film feeding means engaging the film between said members for feeding the film from said delivery member toward said take up member, mechanism for actua'ing said feeding means, means for compensating for the difference in the character of movement of said members and said feeding means, said means including a film engaging member, mechanism for rendering said compensating means operable upon the film, mechanism adapted to move the film into the area of operation of said film engaging member, and control means, said control means including a movable actuating member and mechanism connecting said member with all of said mechanisms for opera'ing said mechanism for positioning the film in the area of operation of said film engaging member upon the first portion of the movement of said actuating member and for operating said means for rendering said compensating means operable upon the film during the succeeding portion of such movement of said actuating member and for operating said mechanism for actuating said feeding means upon the next succeeding portion of such movement.

40. In a film handling apparatus, a toothed feeding member, a taking up member, guiding means cooperating with said members for defining a path between said members through which a film may be fed from one to the other, operable means for moving a film into such path and into la'eral alignment with said members, a motor, a first means for applying the power of said motor to said taking up means, a second means for applying the power of said motor to said feeding member, and control mechanism, said control mechanism comprising a movable actuating member and mechanism connecting said actuating member and all of said means for first operating said moving means upon the first portion of the movement of said actuating member, whereby first the film is initially positioned in such path, second operating said first power applying means upon the continuation of such movement of said actuating member, whereby said taking up member is actuated for drawing the film into operative relation with the teeth of said feeding member, and third operating said second power applying means upon the further continuation of such movement of said member, whereby said feeding member is also actuated and the regular feeding operation along such path is carried out.

41. In a film handling apparatus, two film supporting spindles, means cooperating with said spindles for guiding the film between said spindles and for forming a path of travel for the film therebetween, means for operatively connecting at least one of said spindles with a source of power, means engaging an edge of the film and effective for laterally moving it into such path, and control mechanism interlocking said moving means and said means for connecting said spindle with said source of power and effective for operating each of the same.

42. In a film handling apparatus, a gate comprising a fixed section and a movable section between which a film travels, said movable section being adapted for disposition in a distant relation to said fixed section, a member movable relatively to both of said gate sections for moving the film from a position without its line of travel through the gate in a direction which is angular to such line of travel of the film through the gate into the space which intervenes between said sections when said movable section is disposed in such distant relation to said fixed section, and a connection interlocking both said movable section and said member for moving said film-moving member to ineffective position out of the way of said film preparatory to its movement into the space between said gate sections.

43. In a film handling apparatus, a fixed gate section, a gate section movable relatively to said fixed section, a film-positioning threading member movable into and from cooperative and adjacent relation with both of said sections, a rotatable mounting for said member disposed upon said apparatus adjacent said gate sections, actuating mechanism for said mounting including a longitudinally movable rod, mechanism connecting said rod and said mounting and said movable section of said gate, the longitudinal movement of said rod operating said mounting whereupon said member is rotated into cooperative and adjacent relation with both of said sections, longitudinal movement of said rod also moving said movable section into relatively close relation with said fixed section.

44. In a film handling apparatus, a gate, a member for moving a film without said gate into a predetermined position within said gate, a mounting for said member and mechanism for rotating said mounting for the purpose of operating said member, said mechanism including a toggle connected to said mounting, a spring connected to said toggle, and means initially breaking said toggle, said spring being effective thereafter quickly to complete the breaking movement of said toggle for rotating said mounting to complete the positioning of said film by said member.

45. In a film handling apparatus, means defining a path of travel for a film, means for longitudinally feeding a film through said path, and movable threading means mounted for movement upon said apparatus adjacent an edge of said film path for engaging an edge of the film and initially moving the film in a direction lateral to said path and into said path from a position wherein it is disposed adjacent and at one side of said path to a position wherein it is disposed therewithin, said threading means embodying means whereby said threading means may be moved for initially positioning the film within said path in preparation for the film feeding operation.

46. In a film handling apparatus, means defining a path of travel for a film, a positioning member, a mounting for said positioning member, disposed upon said apparatus adjacent said path of travel, upon which said positioning member is rotatable from a first position in which it is disposed substantially in the plane of such path whereby such path is left unobstructed by said positioning member and open for the lateral insertion of a film therein to a second position in which it is disposed at substantially right angles to such first position and in relatively close right angled relation with an edge of such path whereby the film is locked therein against movement lateral thereto, and means for rotating said positioning member.

47. In a film handling apparatus, means defining a longitudinal path of travel for a film, a member having a normal path of movement within said path for feeding the film along said path, movable threading means mounted for movement upon said apparatus adjacent an edge of said path and said feeding member for engaging an edge of the film and initially moving the film in a direction lateral to said path and substantially parallel to the axis of said feeding member from a position where it is disposed adjacent and at one side of said path to a position wherein it is disposed therewithin and in a predetermined position relatively to said feeding member, said threading means embodying means whereby said threading means may be moved for initially positioning the film in preparation for the film feeding operation.

48. In a film handling apparatus, a toothed feeding member, means adjacent one edge of the field of operation of said feeding member for preventing the movement of the film in a direction lateral thereto, a locking member, a mounting for said locking member adjacent the other edge of the field of operation of said feeding member upon which said locking member is movable between a first position, wherein it is disposed substantially parallel to the axis of said member and lateral access thereto is permitted, and a second position, wherein it is disposed at substantially right angles to such axis and a film is thereby locked by the contact of said locking member against the edge of the film against lateral movement relative to said feeding member, and means for moving said locking member between said positions.

49. In a film handling apparatus, a film feeding member, a rotatable shaft disposed adjacent said member with the axis of said shaft arranged substantially at right angles to the axis of said feeding member, a positioning member mounted upon said shaft, the rotation of said shaft revolving said member to engage an edge of the film placed in the vicinity of said feeding member and said positioning member and thereby to move the film in a direction substantially parallel to the axis of said feeding member and into cooperative relation therewith and opposite thereto, and means for rotating said shaft.

50. In a film handling apparatus, a gate comprising a fixed section and a movable section, said sections being mounted so that said movable section can be disposed in a first position which is relatively distant from said fixed section and in a second position which is relatively adjacent said fixed section wherein said sections engage opposite sides of the film to guide it during the film feeding operation, means for moving said movable section between said first and second positions, means for feeding the film between said sections, and movable threading means mounted upon said apparatus adjacent said gate for engaging an edge of the film and for laterally and initially moving it from a position outside of the space which intervenes between said sections when said movable section is disposed in such first position to a position within said space and opposite the film engaging portions of said sections, said threading means embodying means whereby said threading means may be moved for initially positioning the film within said gate in preparation for the film feeding operation.

51. In a film handling apparatus, a gate comprising sections between which a film may be fed, mechanism for moving one of said sections relatively to another, a member for moving the film into a predetermined position relative to said movable section, a mounting for said member rotatable upon an axis substantially parallel to the line of travel of a film through said gate and disposed in cooperative and adjacent relation with said gate, and operating means operatively interconnecting said gate moving mechanism and said mounting.

52. In a film handling apparatus, a gate which comprises a relatively fixed section and two bodily movable sections, a first means for moving a first of said movable sections from a position relatively distant from the second of said movable sections into adjacent and cooperative relation with said second movable section whereby a film with which said second section engages is brought into opposite and relatively adjacent relation with said second movable section so that it may be engaged and moved thereby, a second means for moving said second movable section into adjacent and opposite relation with said fixed section whereby said film is brought into engagement therewith, an operative interconnection between said first and second means for first operating said first means and thereafter operating said second means, and means for feeding the film between second movable section and said relatively fixed section.

53. In a film handling apparatus, a gate which comprises a relatively fixed section and two movable sections, means for mounting said relatively fixed section and a first of said movable sections so that said relatively fixed section and said first movable section are disposable in spaced and parallel relation to each other so that a film may be inserted therebetween, means for mounting the second of said movable sections so that it is movable into right angled and adjacent relation with both of said other mentioned sections, extending across the space intervening therebetween, means for moving said second movable section into said last previously mentioned relation, and means for moving said first movable section into cooperative and adjacent relation with said fixed section.

54. In a film handling apparatus, a gate which comprises a relatively fixed section and two movable sections, means for mounting said relatively fixed section and a first of said movable sections so that said relatively fixed section and said first movable section are disposable in spaced and parallel relation to each other so that a film may be inserted therebetween, a stop formation extending from said fixed section in a direction normal thereto for engaging one edge of the film thereby limiting its movement, means for mounting the second of said bodily movable sections so that it is movable into right angled and adjacent relation with the edges of the film engaging portions of both of said other mentioned sections and extends across the space intervening therebetween engaging the other edge of the film and laterally moving the film so that said first mentioned edge is moved and held against said stop formation, means for moving said second movable section into said last previously mentioned relation, and means for moving said first movable section into cooperative and adjacent relation with said fixed section.

55. In a film handling apparatus, a gate which comprises a fixed section and two sections movable relatively thereto and sequential operating mechanism operatively interconnecting both of said movable sections and including devices for first moving a first of said movable sections from a position relatively distant from the second of said movable sections into cooperative and right angled relation with said second movable section whereby a film with which said first section engages is brought into opposite and relatively adjacent relation with said second movable section so that it may be engaged and moved thereby upon the subsequent movement of said second section and devices for thereafter moving said second movable section into adjacent and cooperative relation with said fixed section whereby said film is brought into engagement therewith.

56. In a film handling apparatus, an apertured openable gate which when closed is rectangular in cross section, means for feeding a film through said gate, said gate comprising two fixed members in engagement one with the other, one of which is positioned substantially at right angles to the optical axis of the aperture of said gate and the other of which is positioned substantially parallel to such axis, said two fixed members thereby forming two adjacent sides of such rectangles, two members movable relatively to each other and to said fixed members, and a mounting for each of said movable members, said mounting for the first of said movable members having means by which said member may be moved from a relatively distant position into adjacent cooperative and parallel relation with said fixed member which is positioned substantially at right angles to such axis, thereby forming a third side of such rectangle, and said mounting for the second of said movable members having means by which said second member may be moved from a relatively distant position wherein it leaves the space between said first movable member and said first mentioned fixed member open for the insertion of a film into cooperative relation with said other mentioned movable member and said fixed member and into a position substantially parallel to that of said second mentioned fixed member thereby closing said space and making the fourth side of and completing such rectangle and completing the closing of said gate.

57. In a film handling apparatus, an openable apertured gate which when closed is rectangular in cross section, said gate comprising two fixed members in engagement one with the other, one of which is positioned substantially at right angles to the optical axis of the gate and the other of which is positioned substantially parallel to such axis, said two fixed members thereby forming two adjacent sides of said rectangle, and two members, movable relatively to each other and to said fixed members, one of said movable members having a mounting upon which it may be moved from a relatively distant position into cooperative and parallel relation with said fixed member which is positioned substantially at right angles to such axis thereby forming third side of said rectangle and the other of said movable members having a mounting upon which it may be moved from a relatively distant position in a direction angular to said optical axis and into cooperative relation with said first mentioned movable member and said first mentioned fixed member and into a position substantially parallel to said second mentioned fixed member thereby making the fourth side of and completing said rectangle and completing the closing of said gate, and means operatively interconnecting said movable members for moving both of said members.

58. In a film handling apparatus, an openable apertured gate which when closed is rectangular in cross section, said gate consisting of two fixed members, one of which is positioned substantially at right angles to the optical axis of said gate and the other of which is positioned substantially parallel to such axis, said two fixed members thereby forming two adjacent sides of such rectangle, and two members bodily movable relatively to each other and to said fixed members, means for mounting one of said movable member for movement into cooperative and parallel relation with said fixed member which is positioned substantially at right angles to such axis, thereby forming a third side of such rectangle, means for mounting the other of said movable members for movement into adjacent and cooperative relation with said other movable member and said first mentioned fixed member and into a position substantially parallel to said second mentioned fixed member, thereby forming the fourth side of and completing such rectangle and completing the closing of said gate, and sequential control mechanism operatively interconnecting said movable members and including instrumentalities for operating each of said members in successive relation to the operation of the other thereof.

59. In a film handling apparatus, an apertured gate which consists of two fixed adjoining members, one of which is positioned substantially at right angles to the optical axis of said gate and the other of which is positioned substantially parallel to such axis and at right angles to said first mentioned fixed member, such disposition of said fixed members being effective to define a first and second side of the path of the film through said gate, and two members bodily movable relatively to each other and to said fixed members, a mounting for one of said movable members upon which it may be moved from and to an adjacent and cooperative position relative to both of said fixed members wherein it defines a third side of such path, a mounting for the second of said movable members upon which it may be moved from and to adjacent and cooperative position relative to said first mentioned fixed member and said first movable member wherein it defines a fourth side of such path, and means operatively interconnecting said movable members and including instrumentalities for moving both of said movable members from such path defining positions to positions relatively distant from said fixed members and from each other whereby the movement is permitted to the film both in a direction along said optical axis and in a direction at right angles thereto.

60. In a film handling apparatus, an openable gate through which a film travels, operable threading means cooperating with said gate for laterally positioning the film therein, means for closing said gate, and sequential control mechanism operatively interconnecting said threading means and said gate closing means and including devices for first operating said threading means and thereafter operating said gate closing means.

61. In a film handling apparatus, an openable sectional gate through which a film travels, said gate comprising a fixed section and a section movable relatively thereto between a position wherein said sections are disposed in adjacent relation whereby a film is pressed therebetween, and a second position wherein said sections are disposed in distant relation whereby a film may be positioned within the space so intervening between said sections, threading means cooperating with said gate sections for laterally positioning the film within the space so intervening between said sections when said sections are disposed in said distant relation, and sequential operating mechanism operatively interconnecting said movable gate section and said threading means for first operating said threading means and thereafter moving said movable gate section from said distant to said adjacent position.

62. In a film handling apparatus, a gate, said gate comprising a section fixed upon said apparatus and a section mounted upon said apparatus for movement relatively thereto and to said fixed section, said sections establishing a path for a film in said apparatus, and said movable section being movable between a distant position to said fixed gate section whereby a film may be inserted between said sections and an opposite parallel and adjacent relation with said fixed section for pressing a film thereagainst, and operable film threading means, said threading means embodying a film positioning member, and a rotatable mounting for said film positioning member mounted upon said apparatus adjacent the edge of said film path and embodying means whereby said positioning member is rotatable thereon from a position substantially in the plane of said path whereby a film may be laterally placed therein when said gate sections are in distant relation into right angled and adjacent relation to the edge of said film path established between said sections whereby lateral movement of the film is prevented.

63. In a film handling apparatus, a gate which comprises a relatively movable section and two bodily movable sections, means for moving a first of said movable sections from a position relatively distant from the second of said movable sections into adjacent and cooperative relation with the edge of said second movable section whereby a film with the edge of which said second section engages is brought into opposite and relatively adjacent relation with said second movable section so that it may be engaged and moved thereby, means for positively limiting such movement of said first section, means for moving said second movable section with adjacent and opposite relation with said fixed section whereby said film is brought into engagement therewith, and means for feeding the film through said gate.

64. In a film handling apparatus, a gate, means for feeding a film through said gate, said gate comprising a fixed film engaging section, parallel guiding structures extending from said fixed section and spaced apart a distance slightly greater than the width of the film thereby cooperating with said fixed section to form three of the sides of the track through which the film may be fed, a movable film engaging section movable from a first or open-gate position relatively distant from said fixed section wherein space intervenes between said sections so that the film may be initially inserted between said sections and a second or closed-gate position wherein said movable section is disposed opposite and parallel and adjacent to said fixed section and cooperates with said fixed section and said parallel structures to form the fourth side of said film track, means for moving said movable section between said first and second positions, and threading means mounted adjacent said gate adjacent said film track for engaging an edge of the film for moving the film in a direction angular to said film track and into a position opposite thereto while said movable gate section is disposed in said first or open-gate position so that upon the movement of said movable gate section into said second or closed-gate position the portions of the film adjacent an edge thereof will not be caught between one of said structures and said movable section thereby interfering with the subsequent feeding operation.

65. In a film handling apparatus, a gate, said gate comprising a fixed section and a section movable relatively to said fixed section between a first or gate-closed position wherein it is disposed in adjacent and parallel relation to said fixed section and presses the film into engagement therewith and a second or gate-open position wherein it is disposed in relatively distant relation to said fixed section and thereby leaves a space therebetween wherein a film may be initially inserted, means for moving said movable section between said positions, a film threading member movable relatively to both of said sections, and a rotatable mounting for said member adjacent the edge of said gate, said mounting including means whereby said member may be moved from a first position wherein it extends away from said gate and leaves said space open for the initial insertion of the film therewithin and a second position wherein it is disposed in adjacent relation to said gate and across space intervening between said gate sections while said movable gate section is disposed in its said second or distant relation, the movement of said member from its said first to its said second position being effective for moving a film which is in engagement therewith into said space between said sections.

66. Apparatus according to claim 65, said apparatus including a spring for rotating said member upon said mounting, and an operating connection between said means for moving said gate section and said spring for applying the power of said spring upon the first portion of the operation of said moving means for moving said movable gate section toward said fixed section thereby moving said member to its second position before said movable gate section is disposed in its first position thereby closing the gate so that the film is properly positioned within said gate before said gate can be completely closed.

67. In a film handling apparatus, an openable apertured gate which when closed is rectangular in cross section, said gate consisting of two fixed members, one of which is positioned substantially at right angles to the optical axis of said gate and the other of which is positioned substantially parallel to such axis, said two fixed sections thereby forming two adjacent sides of such rectangle, and two members bodily movable relatively to each other and to said fixed members, a mounting for one of said members for moving it into adjacent and cooperative relation to said fixed member which is positioned substantially at right angles to such axis, thereby forming a third side of such rectangle, a mounting for the other of said movable members for moving it into adjacent and cooperative relation with the first named movable member and said first mentioned fixed member wherein it is substantially parallel to said second mentioned fixed member, thereby forming the fourth side of and completing such rectangle and completing the closing of said gate, and interlocking sequential control mechanism connecting said movable members, said interlocking mechanism including devices effective for first operating said second named movable member and thereafter for operating said first named movable member.

68. In a film handling apparatus, a plurality of film engaging means having a path of travel for a film therebetween, an apertured member disposed between said film engaging means and in said path of travel, means for moving a film in a direction angular to said path from a space outside of said path to a position within said path and opposite the aperture of said member for the purpose of correctly initially positioning the film in relation to said aperture, means for feeding the film along said path past said aperture after such initial positioning, mechanism for rendering said feeding means operative to feed the film, and control mechanism interconnecting said positioning means and said mechanism for rendering said feeding means operative to feed the film and effective for assuring the operation of said positioning means prior to the operation of said mechanism for rendering said feeding means operative to feed the film.

69. In a film handling apparatus, a plurality of film engaging means having a path of travel for a film therebetween, an apertured member disposed between said film engaging means and in said path of travel, means for moving a film in a direction angular to said path from a space outside of said path to a position within said path and opposite the aperture of said member for the purpose of correctly initially positioning the film in relation to said aperture, means for feeding the film along said path and past said aperture after such initial positioning, and a single actuating mechanism interlocking both said positioning means and said feeding means and effective for rendering said feeding means effective to feed the film and to actuate said positioning means.

BARTON ALLEN PROCTOR.